UNITED STATES PATENT OFFICE.

HERMAN L. HARTENSTEIN, OF CONSTANTINE, MICHIGAN, ASSIGNOR, BY MESNE ASSIGNMENTS, TO CONTINENTAL INVESTMENT COMPANY, OF DULUTH, MINNESOTA, A CORPORATION OF MINNESOTA.

MANUFACTURE OF CALCIUM CARBID.

946,510.  Specification of Letters Patent.  Patented Jan. 11, 1910.

No Drawing.  Application filed May 5, 1906. Serial No. 315,450.

*To all whom it may concern:*

Be it known that I, HERMAN L. HARTENSTEIN, a citizen of the United States, residing at Constantine, in the county of St. Joseph and State of Michigan, have invented certain new and useful Improvements in the Manufacture of Calcium Carbid, of which the following is a full, clear, and exact specification.

This invention relates to the manufacture of calcium carbid and comprises a method of producing calcium carbid wherein the molten carbid coming from a suitable furnace is tapped into a large receptacle and allowed to remain in a heated molten condition for a certain time, successive tappings being sent to a common receptacle; all as more fully hereinafter set forth and as claimed.

In the manufacture of calcium carbid, it is customary to allow the large body of molten carbid produced in each operation to solidify either in the furnace in which it is formed or in special ingot molds. The large bodies of carbid thus produced are afterward broken up or crushed to form the commercial granulated material. It is found in practice however that the granulated material thus produced varies considerably in acetylene producing power and in rapidity of reaction with water. There are serious variations in the chemical composition and gas producing power of the carbid ingots from different furnaces or from ingots from the same furnace made at different times or in different runs. These variations result in corresponding differences in the granulated carbid and in a mixture of granules from different sources some act more slowly than others in contact with water, with a consequent "after generation" in the acetylene generator which is very objectionable both from the point of economy as well as from the point of safety. In order to avoid this difficulty and to produce ingots of standardized composition and high quality, in the present invention the molten product is taken from several furnaces and commingled in a common receptacle or reservoir to form a large body of such molten material, or the molten product from several tappings of the same furnace may be so commingled. Carbid from the large body of molten material may be drawn off into ingot molds or the whole mass may be subsequently solidified. The solidified product so obtained is not only of uniform, homogeneous standardized composition but is usually materially better than the average of the several tappings used to form it.

The lack of uniformity between different ingots in the common practice may be due to a number of causes, some being special to the particular furnace employed and its action upon the particular charge, and some being due to variations in the charge, to variations in the current, and to variations in the time of treatment given. Still other variations however are due to incomplete conversion of the material for one reason or another, and in addition portions of the unconverted charge are apt to drop down during the tapping and pass out with the molten mass through the tap hole. By holding a comparatively large mass of the carbid in a molten state however not only are other variations averaged out but the conversion is finished, unconverted lime and carbon reacting to furnish carbid. In the large mass or dominant pool of molten carbid any unconverted or partly converted material will eventually be converted and become equal in quality to the rest of the mass. Successive tappings of the highly heated molten carbid into the same receptacle serve to maintain the temperature at the necessary point. It is desirable that the receiver employed should be protected against loss of heat, being covered and otherwise protected, and it may advantageously be provided with means for imparting additional heat to the material therein to compensate for unavoidable radiation and other losses.

If desired, the mixing may be accomplished by merely receiving in a large ladle or mold a plurality of "taps" or runs from several different furnaces or the molten material obtained from the same furnace at different times, the mixing due to the pouring or casting into and from the ladle being often sufficient. It is ordinarily more desirable, however, to have the receptacle of comparatively large dimensions and adapted to hold the material for some length of time to enable incomplete reactions to complete themselves; this large receptacle being utilized as a common receiver into which are to be run the various tappings from the various furnaces or from the same furnace at different times. From time to time molten carbid is withdrawn from this common receiver and run into ingot molds, a portion only of the entire mass being withdrawn in any one casting and the supply being replenished from time to time. In this method of operation, variations in the composition of the molten material are averaged out, reactions are given time for completion and the receiver is maintained at the desired high temperature. As stated, the heat of the carbid itself may be supplemented by other heat. In this manner of operation, as will be seen, not only is the composition of each individual ingot maintained constant at a standard richness, but the ingots are homogeneous and are richer than is usual. Not only are the ingots from a week's run of standard composition but they are higher in gas producing power than where the furnaces are directly tapped to furnish individual ingots.

The results thus produced are much superior to those where an attempt is made at averaging and standardizing the product by commingling carbid after it is solidified and granulated. Such a method does not of course secure enrichment of the material and is furthermore positively objectionable for the reason already pointed out; viz., that different granules from different sources may vary in rapidity of reaction with water so that such commingling may give rise to the detrimental "after generation" in the acetylene producer. Furthermore, handling of the crushed carbid is to be avoided as much as possible for the reason that the material steadily deteriorates on exposure to air and the mixing operation involves additional handling while, since carbid made at different times must be so commingled, some portion of the crushed carbid must await the production of other portions prior to commingling and packaging with attendant deterioration.

What I claim is:—

1. In the manufacture of calcium carbid, the process which comprises blending together while in a hot molten state several quantities of molten carbid of different degrees of gas producing power.

2. In the manufacture of calcium carbid, the process which comprises blending together while in a hot molten state several quantities of molten carbid of different degrees of gas producing power and maintaining the mass in a molten state until the heat of the portion which has reached an advanced stage of conversion further converts the remaining portions of the mass.

3. In the manufacture of calcium carbid, the process which comprises mixing together successive portions of molten carbid differing in their gas producing qualities, extracting portions only of the composite molten product without entirely removing the whole and successively replenishing the mass with fresh additions.

4. In the manufacture of calcium carbid, the process which comprises blending together while in a molten state several quantities of molten carbid of different degrees of gas producing properties and finally forming the entire mass into a plurality of ingots.

5. In the manufacture of calcium carbid, the process which comprises blending together while in a molten state molten carbid obtained from several sources of production whereby the unconverted material obtained from one source will be converted by the carbid obtained from another source and the material from the several sources will be rendered homogeneous and rendered uniform in gas producing qualities.

6. In the manufacture of calcium carbid, the process which comprises tapping successive portions of molten carbid into a comparatively large body of carbid maintained in a molten state.

7. In the manufacture of calcium carbid, the process which comprises tapping successive portions of molten carbid into a comparatively large body of carbid maintained in a molten state, successive portions of said molten body being tapped off from time to time to produce ingots.

8. In the manufacture of calcium carbid, the process which comprises maintaining the molten calcium carbid tapped from a furnace in a molten condition for a sufficient period of time subsequent to such tapping to enable conversion of unconverted portions.

9. In the manufacture of calcium carbid, the process which comprises maintaining a comparatively large molten mass of carbid into which successive tappings from the furnace or furnaces are led and from which successive ingot castings are made.

In testimony whereof I have signed my name to this specification, in the presence of two subscribing witnesses, on this 2nd day of May A. D. 1906.

HERMAN L. HARTENSTEIN.

Witnesses:
 PEARL DENHAM,
 NELLIE ORTON.